Feb. 23, 1932.        T. BROWN ET AL        1,846,674
CULTIVATOR RIG MOUNTING
Filed June 29, 1928        3 Sheets-Sheet 1

WITNESS
Walter Ackerman

INVENTORS
Theophilus Brown
Walter H. Silver
BY Brown, Jackson, Boettcher
ATTORNEYS Feb. 23, 1932. T. BROWN ET AL 1,846,674
CULTIVATOR RIG MOUNTING
Filed June 29, 1928  3 Sheets-Sheet 3

Patented Feb. 23, 1932

1,846,674

UNITED STATES PATENT OFFICE

THEOPHILUS BROWN AND WALTER H. SILVER, OF MOLINE, ILLINOIS, ASSIGNORS TO DEERE & COMPANY, OF MOLINE, ILLINOIS, A CORPORATION OF ILLINOIS

CULTIVATOR RIG MOUNTING

Application filed June 29, 1928. Serial No. 289,223.

The present invention relates to cultivators, and has particular reference to tractor propelled cultivators wherein the cultivating rigs are supported at the front end of the tractor and are arranged to be raised and lowered under the power of the tractor. While such construction constitutes the preferred embodiment of our invention, it will be understood that some of the improved features of construction can also be used in other types of cultivating implements.

One of the principal objects of the invention is to provide an improved rig mounting whereby the rigs are raised and lowered with a "parallel lift" motion, i. e., each rig beam is maintained substantially parallel with or at a fixed angle to the ground in all of the raised and lowered positions of the rig beam.

Such motion of the rig beam is advantageous in that the two or more shovels carried at different points along the length of the rig beam are thus caused to assume the same cultivating depth in the ground for each adjustment of the rig. Another advantage of particular importance in motor driven cultivators is that by virtue of this parallel lift motion the central rig beams which are disposed under the tractor can be raised to the desired height necessary for transport without the possibility of these beams striking the under side of the tractor.

The present rig mounting embodies certain novel features which adapt it to the structural limitations and requirements of a motor driven cultivator, as will hereinafter appear.

In these motor driven cultivators wherein the cultivator shovels are forced down into the ground by power, as well as being raised by power, it sometimes happens that in lowering the rigs one of the shovels will strike a rock or other obstruction, or extremely hard ground, such as will prevent the shovel from entering the ground. In the absence of any relief to take care of this situation, there is the possibility of breaking the cultivator rig or the power lift mechanism, since under such condition a considerable part of the weight of the front end of the tractor and implement may be brought to bear upon this shovel or shovels.

Another object of the invention is to provide improved spring relief means which will yield under such conditions and prevent the possibility of breakage of the parts. Preferably, this spring relief means is associated with each individual cultivator rig so that only the rig which encounters an obstruction is withheld from entering the ground.

A further object of the invention is to provide an improved independent depth adjustment for each cultivator rig. In its preferred embodiment, such adjusting mechanism is associated with the spring relief part of the cultivator rig, thereby simplifying the construction and also leaving the actuating member of the depth adjusting mechanism readily accessible.

Other objects and advantages of the invention will appear in the following description of a preferred embodiment of the invention.

In the accompanying drawings illustrating such embodiment:—

We have chosen to illustrate our invention in a type of motor driven cultivator which is disclosed in the copending application of Theophilus Brown, Serial No. 128,929, filed August 13, 1926, certain features of the present construction also being disclosed in the co-pending application of Elmer McCormick, Ser. No. 257,177, filed February 27, 1928. Accordingly, we shall not describe in any great detail the general construction and features constituting the subject matter of the above applications.

The implement, in its entirety, comprises a main or tractor frame 11, of any design suitable to support the parts of the implement, and supported at the rear by traction wheels (not shown) arranged to be propelled by a motor mounted on said frame and enclosed in a suitable housing or hood 13 at the front end of the tractor, in accordance with the usual practice.

The front end of the tractor frame 11 has pivotal mounting on a front axle 14 which supports the front steering wheels 15 at its outer ends, the pivotal mounting of the tractor frame on the axle 14 permitting transverse rocking movement between the frame and axle. The wheels 15 have pivotal mounting on the ends of the axle 14, similarly to the mounting of automobile wheels, and are arranged to be steered through a suitable steering wheel which is disposed in proximity to the operator's seat at the rear end of the tractor.

The cultivator unit of the implement is preferably constructed in the form of an attachment adapted for mounting on the front end of the tractor unit just described. Said cultivator rig comprises two laterally spaced rig beams 17, 17 extending rearwardly under the front of the tractor between the two steering wheels 15; it also comprises two similar rig beams disposed outwardly to the righthand side of the tractor unit and a similar pair of rig beams disposed outwardly to the lefthand side of the tractor unit. A description of the application of the invention to the two centrally disposed rigs will suffice for the purposes of the present description, as the application of the invention to the laterally disposed rigs is substantially a duplication thereof. The two central or intermediate rigs 17 are pivotally coupled at their front ends to a transverse bar 18 which constitutes a part of the central frame structure of the cultivator unit.

Figure 1:
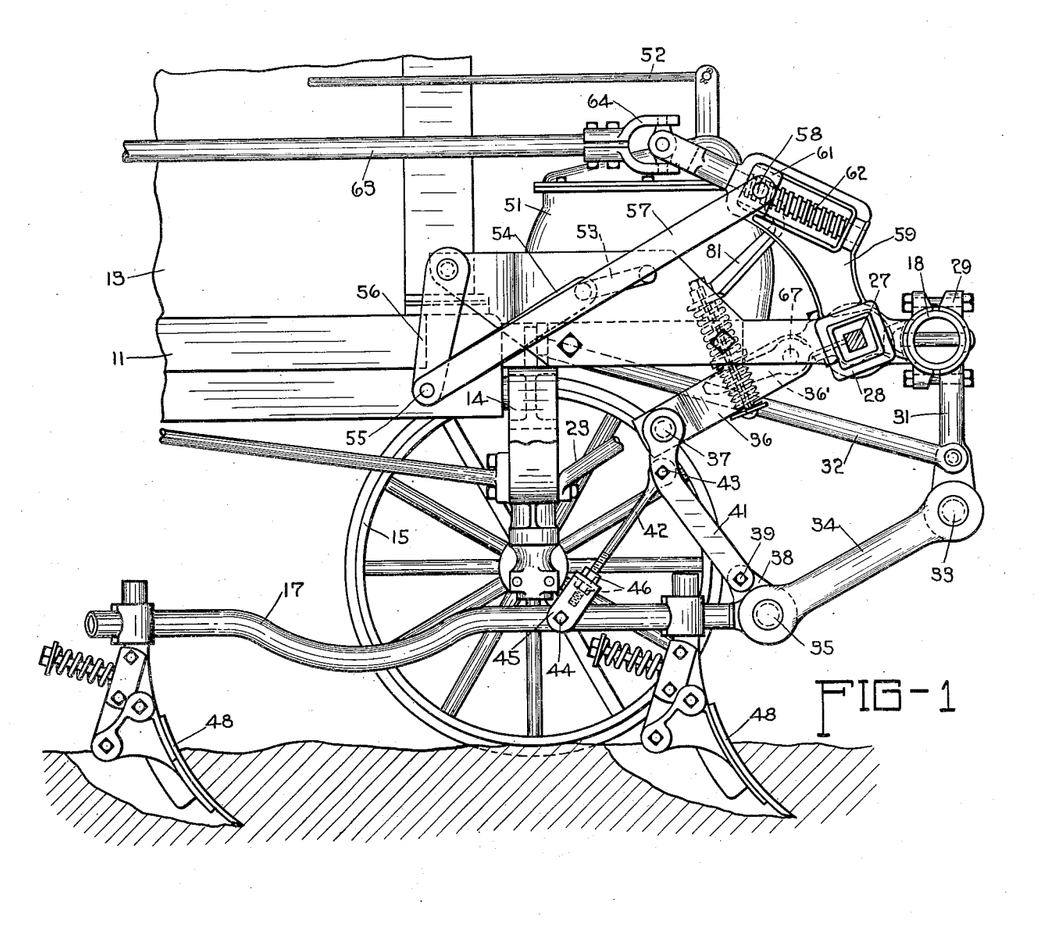
Fig. 1 is a fragmentary side view illustrating the mounting of the cultivating implement on the front of the tractor and showing the rigs at approximately a maximum depth of penetration, this figure corresponding substantially to a longitudinal section taken just inside the adjacent front wheel of the tractor.
Figure 3:
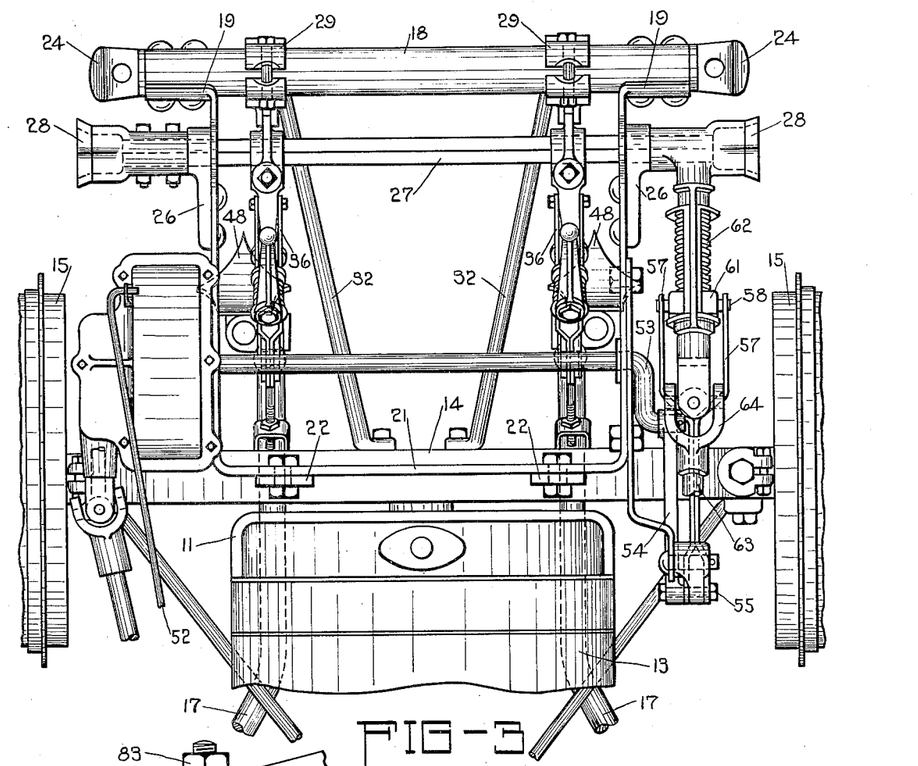
Fig. 3 is a fragmentary plan view showing the mounting of the central portion of the cultivator implement on the tractor.

Referring to Fig. 3, such bar is rigidly secured to the outwardly projecting ends 19 of a U-shaped frame member 21; the transversely extending rear portion of the latter frame member is bolted to lugs or brackets 22 extending upwardly from the front axle 14 of the tractor. The bar 18 is braced against vertically acting stresses by brace bars 23 extending to the outer ends of the front axle, as shown in Fig. 1. As shown in the aforementioned application of Elmer McCormick, the laterally disposed rig beams are mounted on outrigger frames projecting laterally from each side of the tractor unit. Each outrigger frame comprises a front frame bar comparable to the bar 18 of the intermediate frame section, the adjacent ends of the two bars being pivotally connected together whereby each outrigger frame can swing upwardly or downwardly relatively to the bar 18. The apertured coupling members 24 on the ends of the frame bar 18 (Fig. 3) are representative of portions of the coupling devices which pivotally connect this intermediate frame bar with the laterally extending front frame bars of the two outrigger frames. The outer ends of the latter frames are usually supported on castor wheels, and each of such frames has a bracing, pivotal connection with a rear portion of the tractor in order that draft power can be transmitted from the tractor to said frames.

Pivotally supported in bearings 26 carried by the side portions of the U-shaped frame member 21 is a rock shaft 27 extending substantially parallel with the front frame bar 18 and disposed in rear thereof.

Each of the outrigger frames previously mentioned also has a rock shaft mounted thereon, corresponding to the rock shaft 27 and axially aligned therewith. The adjacent ends of the three rock shaft sections are pivotally coupled together through universal joint connections, the socket members 28 secured to the ends of the shaft 27 being representative of parts of these universal joint connections. The flexible coupling established between the three rock shaft sections accommodates the rise and fall of the outer ends of the laterally extending shaft sections, as the outrigger frames rise and fall in passing over uneven ground.

Secured to laterally spaced points of the frame bar 18 are clamping brackets 29 from which depend rigid arms 31 (Fig. 1). Each of these arms is disposed in the fore and aft plane of one of the rig beams 17, and the lower portion of each arm is braced against draft stresses by a brace bar 32 extending rearwardly to a point of attachment on the axle 14. The lower end of each arm 31 carries a pivot pin 33 on which is pivotally supported a link 34, the front end thereof preferably being bifurcated to embrace the lower end of the arm 31. The rear end of each link 34 is also preferably bifurcated, and carries a pivot pin 35 which pivotally connects the link to the front end of the rig beam 17. Extending rearwardly from the rock shaft 27 is a link or arm 36 which swings vertically with the rocking movement of said shaft. The rear end of the link or arm 36 carries a pivot pin 37.

The spacing from said pin to the axis of the rock shaft 27 is substantially the same as the spacing from the pin 35 to the pivot center 33 at the front end of the link 34, the two links 34 and 36 thus being of substantially the same effective length. Extending between the pivots 35 and 37 is a link mechanism which carries the rig beam 17 and which maintains the pivots 35 and 37 at a substantially definite spacing. The two links 34 and 36 extend along generally parallel lines, affording, in effect, an approximately parallel system of links by which the rig beam is lifted and lowered with a movement which maintains the rig beam substantially parallel with the ground in practically all positions of the beam. The forward end of the beam extends into the bifurcated rear end of the lower link 34 and has pivotal coupling therein on the pin 35. A lug 38, which is formed integral with the front end of the beam 17, extends upwardly from the front end thereof and carries a pivot pin 39. A link 41 is pivotally connected at its lower end to the pivot pin 39, and is connected at its upper end to the pivot pin 37 carried by the upper link 36. Actually, the link 41 preferably consists of two spaced links or straps engaging over the outer sides of the lug 38 and the link 36, but these two links or straps may be regarded as a unit. Another link 42 extends diagonally from the upper portion of the link 41 down to the rig beam 17, being connected to the link and to the beam at the pivot pins 43 and 44, respectively.

Figure 2:
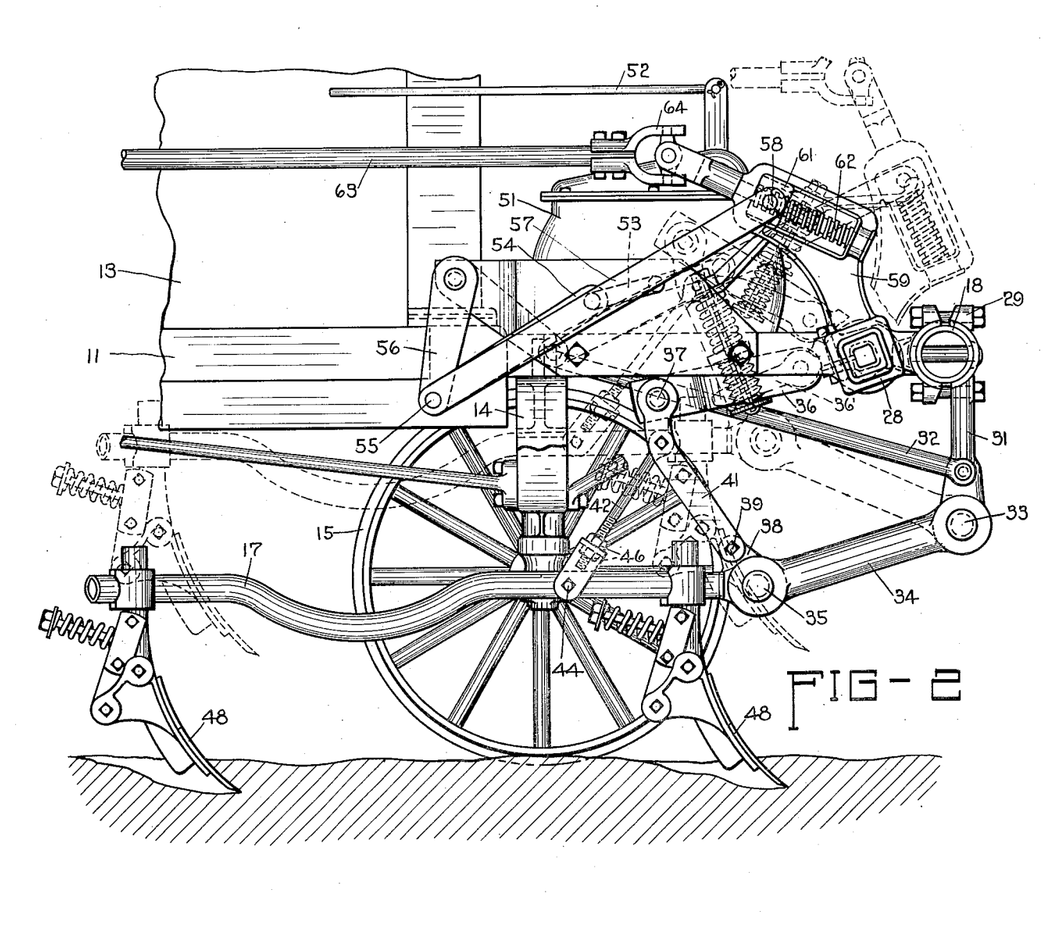
Fig. 2 is a similar view, illustrating in full lines the adjustment of the rigs to a lesser depth of penetration, and illustrating, in dotted lines, the rigs raised to a transport position.

In the construction illustrated in Figs. 1 and 2, the link 42 is in the form of a long eye bolt having its apertured upper end engaging the pivot pin 43 between the two side straps of the link 41 and having its threaded lower end passing through a yoke-shaped member 45, the side portions of which embrace the beam 17 and are connected thereto by the pivot 44. Nuts 46 screwing over the threaded portion of the bolt engage the upper and lower sides of the yoke member 45 and provide and adjustment by which the effective length of the link 42 may be increased or decreased. Such adjustment of the link 42 provides for varying the angle of the rig beam with respect to the links 34 and 36, and may be provided for in the case of all of the rig beams of the implement, or such adjustment may only be provided in the case of a few of the beams so that relative adjustments may be made therebetween. It will be understood that each rig carries a plurality of the usual cultivator shovels or other types of tilling tools 48, the details of which constitute no part of the present invention, and it will also be understood that the several rigs are so disposed as to cultivate the soil on both sides of three plant rows, as is well known in these implements. The mounting of the laterally disposed rigs on the two outrigger frames is practically a duplication of the arrangement above described, each rig having draft connection through a link 34 which is carried by a frame bar corresponding to the bar 18, and each rig being raised and lowered through a link 36 which extends rearwardly from a rock shaft corresponding to the rock shaft 27.

In considering the operation of this parallel lift mechanism for each rig beam, it will be observed from the three positions indicated in Figs. 1 and 2 that, as the lifting arm 36 and the draft link or arm 34 swing upwardly and downwardly, the connecting link 41 will remain at all times in substantially the same angle of inclination relatively to the surface of the ground. Owing to the tie link 42, the rig beam 17 constitutes, in effect, a rigid part of the connecting link 41, and, hence, the rig beam will move upwardly and downwardly in a fixed definite relation to the surface of the ground, either parallel thereto or at a fixed desired angle thereto. Thus, in all of the depth adjustments which may be given the rig beams, the two or more tilling tools 48 mounted on the rig beam will always have the same depth of cultivation. Likewise, when the rig beams are raised to transport position the parallel lift motion will permit all of the beams to be raised to a considerable height without the possibility of the two centrally disposed beams striking the under side of the tractor. Attention is also directed to the fact that as the links or arms 34 and 36 swing downwardly, they also move forwardly, and as they swing upwardly they move rearwardly, whereby, as the shovels are being forced into the ground by the power lift mechanism upon starting the cultivation of a new series of rows, they slide forwardly in the soil, and, whereby, when the cultivator shovels are raised by the power lift mechanism at the ends of the rows, they slide rearwardly out of the soil.

It will be understood that these forward and rearward movements of the cultivator shovels reduce the amount of power necessary to raise and lower the shovels between transport and operative positions, even though the machine be travelling when the rigs are raised or lowered. It will be understood that, instead of pivoting the lower end of the link 41 to the beam lug 38 on the pin 39, the link might be pivotally mounted on the pin 35. Similarly, the upper end of the adjustable tie link 42 might be pivotally mounted directly upon the upper pivot pin 37 instead of upon an intermediate pivot pin 43. The constructions disclosed, however, are preferable because they avoid the establishment of numerous pivotal mountings on the same pivot pin. It will be understood that if no relative angular adjustment is desired between the connecting link 41 and the rig beam 17, the two links 41 and 42 may, if desired, be constructed as a rigid part of the rig beam, since, in the normal operation of the mechanism, no relative movement occurs between these parts.

The mechanism for transmitting rocking movement to the rock shaft sections 27 is fully described in the above mentioned copending applications. In brief, it comprises a power lift clutch of the half revolution or one-cycle-stop type such as is extensively used in power lift plows and other implements. Such clutch is enclosed in a housing 51 and derives its operating power from the engine of the tractor, being tripped for each of its cyclical operations by an actuating or trip rod 52.

The crank 53, which is rotated through half revolutions by this clutch, is pivotally connected to the front end of a link 54. The rear end of such link is pivotally connected at 55 to a swinging arm 56 suitably mounted on the frame of the implement. A long link 57 extends forwardly from the pivot 55 and has pivotal connection at 58 with an arm 59 extending upwardly from one of the rock shaft sections. As described in the above mentioned application of Elmer McCormick, provision is made for shifting the pivot center 58 relatively to the arm 59 for effecting a master depth adjustment of all of the rig beams, such being attained by mounting the pivot 58 on a threaded block 61 adapted to be screwed back and forth along a threaded rod 62 which is journaled in an open yoke portion of the arm 59. The threaded rod is adapted to be rotated from the operator's position through a shaft 63 which is coupled with one end of the rod through a universal joint connection 64. Rotation of the shaft 63 screws the nut 61 either forwardly or backwardly along the threaded rod 62, thereby rocking the shaft 27 to effect a master depth adjustment of all of the rig beams for different depths of cultivation, it being understood that such movement of the nut along the rod 62 will effect rocking movement of the arm 59 since the rear end 55 of the link 57 is held at such time in a stationary position through the locked condition of the power lift clutch. When it is desired to raise all of the rigs to transport position, the clutch is tripped to effect a half revolution of the crank 53.

This transmits a forward thrusting movement to the link 57, thereby swinging the arm 59 upwardly and forwardly to approximately the dotted line position illustrated in Fig. 2, raising all of the rigs to transport position. The parts are so proportioned and the construction is such that the rigs will always be raised to the same height when lifted to transport position, irrespective of the master depth adjustment established through the block 61 and threaded rod 62.

Figures 4, 5:
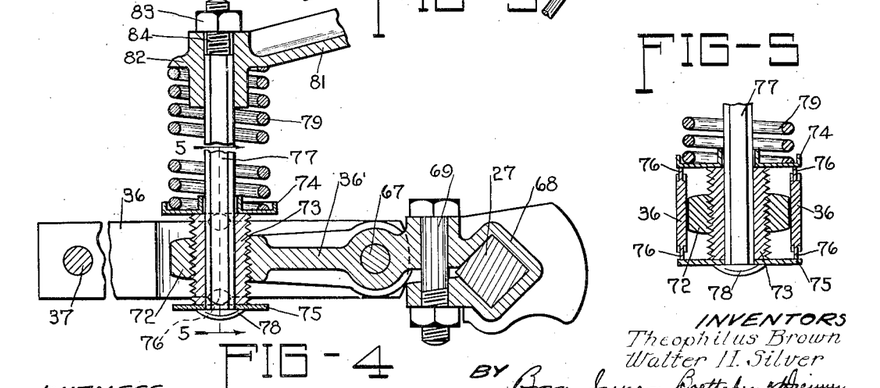
Fig. 4 is a detail sectional view through the spring relief mechanism and the independent depth adjusting mechanism associated with each rig.
Fig. 5 is a detail sectional view taken approximately on the plane of the line 5—5 of Fig. 4.

It is desirable that an independent depth adjustment be provided for each rig beam so that the various rigs may be given different settings for cultivating in depressions between the plant rows, along ridges, etc. Such independent depth adjustment is provided in each lifting arm 36, consisting in dividing this arm into two sections and providing means whereby said sections can be angled relatively to each other in a vertical direction for adjusting the height of the individual rig beam 17. Referring to Figs. 4 and 5, it will be seen that the outer or main section of the lifting arm 36 consists of two parallel bar portions which are spaced apart at their forward ends. The other section of the lifting arm consists of a bar member 36' which extends between the laterally spaced bar portions 36 of the other arm section. The two sections are pivoted together by a pivot pin 67 which extends through the arm section 36' and through the two laterally spaced side portions 36 adjacent to the front ends of the latter.

The front end of the arm section 36' is formed with a split hub portion 68 of polygonal cross-section which is rigidly clamped to the rock shaft 27 by the clamping bolt 69, whereby the arm section 36' oscillates as a unit with the rock shaft 27. The other arm section 36 also swings as a unit with the rock shaft when the two arm sections are maintained in rigid relation, but the latter rock shaft section 36 is also capable of being adjusted angularly relatively to the section 36' around the pivot center 67.

The rear end of the arm section 36' is formed with an internally threaded boss 72 through which screws a threaded sleeve 73. Collars 74 and 75 bear against the upper and lower ends of this threaded sleeve and extend outwardly across the upper and lower edges of the two side bar portions 36. Here these collars bear against bearing projections 76 extending upwardly and downwardly from the upper and lower edges of each side bar portion 36. Such bearing projections have rounded outer edges on which the collars 74 and 75 can rock, and, as shown in Fig. 5, said bearing projections are preferably formed by pressing or indenting the edges of the bars 36 for protruding some of the metal outwardly in the rounded form illustrated in Fig. 4. A polygonal shaft 77 extends down through a polygonal bore in the threaded sleeve 73, affording means whereby the sleeve can be rotated in the threaded boss 72 for effecting an independent depth adjustment. The lower end of said shaft is preferably provided with a shoulder or is headed over as indicated at 78, thereby securing the lower collar 75 to the end of the sleeve 73.

The upper collar 74 is held pressed down against the upper end of the sleeve by a compression spring 79 which is confined between said collar and an actuating crank or handle 81 mounted on the upper end of the shaft 77. Said handle has a hub 82 engaging non-rotatably over the shaft 77, being held on the upper end of the latter by a nut 83 bearing against the top of the hub and screwing over a reduced threaded portion 84 extending upwardly from the end of the shaft 77. The hub 82 is slidable along the shaft 77 and by screwing the nut 83 downwardly or upwardly along the threaded end 84 the pressure on the spring 79 can be increased or diminished.

When it is desired to increase or decrease the independent depth adjustment of the individual cultivator rig, the crank handle 81 is rotated in the proper direction to screw the threaded sleeve 73 either downwardly or upwardly in the threaded boss 72. Downward screwing of the threaded sleeve causes the upper collar 74 to press downwardly on the arm section 36 for obtaining a greater depth of cultivation, and upward screwing of said sleeve results in the lower collar 75 thrusting upwardly on the under side of the arm section 36 for a lesser depth of cultivation. Such swinging movement of the arm section 36 about the pivot 67 causes the collars 74 and 75 to rock slightly on the rocker bearings 76 whereby no binding between the parts can occur.

If, in the act of increasing the depth of cultivation of the individual rig beam, one of the cultivating shovels on said beam should strike a rock or other obstruction tending to prevent the lowering of the beam, the threaded sleeve will continue to screw downwardly in the threaded boss 72, but in so doing will draw away from the upper collar 74 which remains pressing downwardly on the upper edge of the arm section 36 under the constantly increasing pressure of the spring 79. Thus, the spring relief afforded by the compression spring 79 prevents the possibility of breakage of the cultivator shovel or other parts at this time, such as might possibly occur if the weight of the front end of the tractor were brought to bear upon the cultivator shovel in the making of said adjustment. When the shovel is free to move down to the desired depth of cultivation, upon forward movement of the implement, the spring 79 forces the arm section 36 downwardly until the collar 74 comes to bear upon the upper end of the sleeve 73 at the predetermined depth adjustment. The relief spring 79 serves in this same protective capacity when the several rigs are forced down into the soil by the operation of the power lift mechanism. The downward swing of the arm section 36' in the oscillation of the rock shaft 27 carries the threaded sleeve 73 and shaft 75 downwardly therewith, and if the other arm section 36 is prevented from following in this downward swinging movement, the sleeve 73 draws away from the collar 74 and increases the pressure of the spring 79 bearing on said collar. As soon as the cultivator shovel or shovels are clear of their obstructions or are enabled to enter the soil through forward movement of the implement, the spring pressure forces the arm section 36 downwardly until the collar 74 comes to bear upon the upper end of the threaded sleeve 73. Thus, in any of the lowering movements of the cultivator rigs, the shovels thereon and the other parts of the operating mechanism are protected by this spring relief against the possibility of breakage due to the shovels encountering hard soil or obstructions in their path. The pressure at which this spring relief will yield can be conveniently adjusted by screwing the nut 83 upwardly or downwardly along the reduced end 84 of the shaft 77, thereby decreasing or increasing the pressure imposed upon the relief spring. The general operation of the entire implement will be understood from the preceding descriptions of the operation of its component parts. It will be understood that the laterally disposed rig beams on the two outrigger frames have the same construction of independent depth adjusting mechanism and spring relief described above.

While the embodiment which we have illustrated and described constitutes the preferred form of our invention, it will be understood that such embodiment is merely exemplary and that numerous modifications and rearrangements of parts may be made without departing from the essence of the invention.

We claim:—

1. The combination with a cultivating implement comprising a frame and a cultivator rig beam carried thereby, of means for mounting said rig beam on said frame comprising two swinging arms pivoted on fixed axes to said frame, a rocker member operatively connected to lift said rig beam through one of said swinging arms, and a link extending between the swinging ends of said arms, said arms being proportioned and related whereby said link remains at a substantially constant angle relatively to the ground during the swinging movement of said arms, said rig beam being fixedly secured to said link.

2. In a cultivating implement, the combination of a frame, a pair of approximately parallel swinging arms pivoted to said frame, a link extending between the swinging ends of said arms, said arms being proportioned whereby said link remains at a substantially constant angle relatively to the ground during the swinging movement of said arms, a rig beam carried entirely by said link, and means for adjusting the angular relation between said link and said rig beam.

3. The combination with a cultivating implement comprising a frame, and a rig beam carried thereby, of means for mounting said rig beam on the frame comprising a draft link pivoted at one end to a fixed pivot axis on said frame, a rocker member on said frame, a lifting arm extending from said rocker member, and a connecting link operatively connected between the swinging ends of said draft link and said lifting arm, said draft link and lifting arm being proportioned and related whereby said connecting link remains at a substantially constant angle relatively to the ground during the swinging movement of said draft link and lifting arm, said rig beam being mounted to move with said connecting link.

4. In a cultivating implement, the combination of a frame, a draft link pivotally connected with said frame on a fixed pivot axis, a lifting arm mounted for swinging movement on said frame above said draft link, a connecting link extending between the swinging ends of said draft link and said lifting arm, said draft link and arm being proportioned whereby said connecting link remains at a substantially constant angle relatively to the ground during the swinging movement of said draft link and arm, and a cultivator rig beam carried by said connecting link.

5. In a cultivating implement, the combination of a frame, a draft link pivotally connected at its front end with said frame on a fixed pivot axis, a rocker member on said frame, a lifting arm mounted at its front end on said rocker member above said draft link, a connecting link pivotally connected between the rear ends of said draft link and said lifting arm, said draft link and lifting arm being generally parallel and of approximately equal length whereby said connecting link remains at a substantially constant angle relatively to the ground during the swinging movement of said draft link and lifting arm, and a cultivator rig beam carried by and moving with said connecting link.

6. In a cultivating implement, the combination of a frame, a draft member and a lifting member both having their front ends pivotally mounted on fixed pivot axes on said frame with one of said members disposed above the other, a cultivator rig beam, means pivotally connecting the front end of said rig beam with the rear ends of said draft member and lifting member, and a rotatable member with which said lifting member is connected to raise and lower said rig beam, said draft and lifting members being proportioned and related substantially as two parallel links whereby said rig beam remains at a substantially constant angle relatively to the ground in a plurality of its vertically adjusted positions.

7. In a power lift cultivator, the combination of a wheeled frame, a rock shaft mounted on said frame, a draft member pivotally connected at its front end with said frame, a lifting member mounted at its front end on said rock shaft, one of said members being superposed above the other, lifting mechanism connected to rock said shaft and thereby raise and lower said lifting member, a cultivator rig beam extending rearwardly from said members, and means pivotally connecting said rig beam with the swinging rear ends of said draft and lifting members, the latter being of approximately equal length and being related as two substantially parallel links whereby said rig beam remains at a substantially constant angle relatively to the ground in its various lifted and lowered positions.

8. In a power lift cultivator, the combination of a wheeled frame, a rock shaft mounted on said frame, a draft link pivotally connected at its front end to said frame, a lifting arm disposed above said draft link and mounted at its front end on said rock shaft to swing concentrically thereof, lifting mechanism connected to rock said shaft and thereby lift and lower said arm, a cultivator rig beam extending rearwardly from said draft link, and means pivotally connecting said rig beam with the swinging rear ends of said draft link and said lifting arm, said link and arm being approximately parallel and of substantially equal length for raising and lowering said rig beam with a motion maintaining the latter at a substantially constant angle relatively to the ground.

9. In a power lift cultivator, the combination of a wheeled frame, a rock shaft mounted thereon, a draft link pivotally connected at its front end with said frame, a lifting arm mounted at its front end on said rock shaft, a rig beam extending rearwardly from said draft link, a connecting link operatively connecting the rear ends of said draft link and said lifting arm, and a tie link extended between said rig beam and said connecting link.

10. A power lift cultivator comprising a wheeled frame, a rock shaft mounted thereon, a draft link pivotally connected adjacent to its front end of said frame, a lifting arm mounted at its front end on said rock shaft, a rig beam extending rearwardly from said draft link, a connecting link operatively connected between the swinging rear ends of said draft link and said lifting arm, a tie link connected between said rig beam and said connecting link, and means for adjusting the effective length of said tie link.

11. In a power lift cultivator, the combination of a wheeled frame, a rock shaft mounted thereon, power actuated means for transmitting rocking movement to said shaft, a draft link pivotally connected at its front end to said frame, a lifting arm mounted at its front end on said rock shaft and oscillating therewith, said lifting arm being disposed above said draft link, said draft link and lifting arm being approximately parallel and of substantially equal length, a rig beam pivotally connected at its front end with the rear end of said draft link, a lug projecting from said beam, a pivot carried by said lug, a connecting link mounted at its lower end on said pivot and having its upper end pivotally connected with the rear end of said lifting arm, a tie link pivotally connected at its upper end to said connecting link at a point intermediate the ends of the latter, means pivotally connecting the lower end of said tie link with said rig beam at a point intermediate its ends, and means for adjusting the effective length of said tie link.

12. In a power lift cultivator, the combination with a tractor, of a cultivator attachment connected with said tractor and comprising a frame, a rockshaft mounted thereon, power actuated means for transmitting rocking movement to said shaft, a plurality of vertically movable cultivator rigs each comprising a cultivating tool, lifting arms extending from said rockshaft for each cultivator rig, a vertically movable draft link pivotally connecting the front portion of each cultivator rig with said frame, lifting means operatively connecting said lifting arm with its associated cultivator rig, said lifting arm and draft link being substantially parallel and of approximately equal length whereby each rig beam remains at a substantially constant angle relatively to the ground in its various lifted and lowered positions, each lifting arm and lifting means raising its rig with a translatory motion to transport position when said shaft is rocked in one direction, and spring relief means connected to cooperate with each lifting arm and lifting means whereby when said shaft is rocked in the other direction the downward translatory motion of each rig is permitted to be interrupted independently of continued motion of said shaft.

13. In a power lift cultivator, the combination with a tractor, of a cultivator attachment connected with said tractor and comprising a frame, a rockshaft mounted thereon, power actuated means for transmitting rocking movement to said shaft, a lifting arm extending from said shaft, a vertically movable cultivator rig comprising a cultivating tool, a vertically movable draft link pivotally connecting said rig with said frame whereby the entire rig can rise and fall with a translatory motion, lifting means operatively connecting said lifting arm with said cultivator rig for raising said rig with a translatory motion to transport position when said shaft is rocked in one direction, and spring relief means associated with said lifting arm and lifting means and operative when said shaft is rocked in the other direction to permit downward motion of said rig to be interrupted.

14. In a power lift cultivator, the combination of a frame, a plurality of cultivator rig beams carried thereby, two substantially parallel links connecting each beam with said frame for a substantially parallel lift motion of the beam, cultivating elements on said rig beams, three mechanisms for forcing said rig beams downwardly to a greater depth of cultivation comprising power actuated mechanism, master adjusting mechanism and independent adjusting mechanism for each beam, each of said three mechanisms operating to transmit vertically moving force to the associated rig beam through one of said parallel links, and spring relief means for yieldingly transmitting motion to said beams when the latter are caused to move downwardly under the operation of either of said mechanisms.

15. In a cultivator, the combination of a wheeled frame, a rock shaft mounted thereon, a plurality of cultivator rigs carried by said frame, lifting arms for each of said rigs operatively connected with said rock shaft and with the rigs, each of said lifting arms comprising two relatively movable sections, and independent depth adjusting means for each rig operatively connected to effect relative movement between the two sections of the lifting arm associated with the rig.

16. In a cultivator, the combination of a wheeled frame, a rock shaft mounted thereon, a plurality of cultivator rigs, lifting arms operatively connected with said rock shaft and arranged to raise and lower said rigs, each of said lifting arms comprising two relatively movable sections, depth adjusting means connected between said two sections, and spring means operatively connecting the two sections of each arm whereby motion tending to force said rig beams down to a greater depth of cultivation is yieldingly transmitted through said spring means.

17. In a cultivator, the combination of a wheeled frame, a rock shaft mounted thereon, a cultivator rig, a lifting arm for transmitting motion from said rock shaft to said rig, said lifting arm comprising two relatively movable sections, one of which is mounted on said rock shaft and the other of which is operatively connected with said rig, a threaded member carried by one of said sections, a cooperating threaded member adapted to be screwed endwise relatively to said first threaded member, means for causing relative rotation between said threaded members, a device for transmitting the endwise motion of said second threaded member to the other arm section, and a spring interposed between said second threaded member and said motion transmitting device.

18. In a cultivator, the combination of a wheeled frame, a rock shaft mounted thereon, a cultivating rig, a lifting arm for transmitting motion from said shaft to said rig, said lifting arm comprising a first section mounted on said rock shaft and a second section operatively connected with said rig, said sections being pivotally connected together, said second section comprising two spaced bars embracing said first arm section, a threaded boss on said first arm section between said bars, a threaded sleeve screwing into said boss, a shaft extending from said sleeve, a collar at the lower end of said sleeve projecting below the lower edges of said bars, an upper collar extending across the upper edges of said bars above said sleeve, rounded rocker bearings carried by the upper and lower edges of said bars and engaging said collars, a crank handle non-rotatably secured to the upper end of said latter shaft, a compression spring interposed between said crank handle and said upper collar, means for adjusting the position of said crank handle relatively to said latter shaft for determining the pressure of said spring.

19. In a power lift cultivator, the combination with a tractor, of a cultivator attachment mounted on the front end of said tractor and comprising a frame, a rock shaft mounted thereon, power actuated means for transmitting rocking movement to said shaft, master depth adjusting mechanism for adjusting the angular position of said shaft, a draft link pivotally connected at its front end to said frame, a lifting arm mounted at its front end on said rock shaft and oscillating therewith, said lifting arm being disposed above said draft link, a cultivator rig beam, means pivotally connecting said rig beam with the swinging rear ends of said draft link and said lifting arm, said link and arm being approximately parallel and of substantially equal length for raising and lowering said rig beam with a motion maintaining the latter at a substantially constant angle relatively to the ground, said lifting arm comprising two relatively movable sections pivotally connected together, independent depth adjusting mechanism for changing the angular relation between said sections and thereby adjusting the cultivating depth of said rig beam, and a spring transmitting motion from one of said sections to the other whereby motion tending to force said rig beam down to cultivating position is yieldingly transmitted through said spring.

20. In a cultivator attachment for tractors, the combination of a frame adapted for mounting on the front end of a tractor, said frame comprising a transverse bar, a depending member carried by said bar and held against fore and aft swinging motion relatively to said bar, a draft link pivotally connected at the front end with said depending member for swinging movement solely in a vertical plane, a lifting arm pivotally mounted adjacent to its front end on said frame for swinging movement solely in a vertical plane, connecting means between the rear end portions of said draft link and lifting arm, and cultivating devices carried by said connecting means, said link and arm being approximately parallel and of substantially equal length for raising and lowering said cultivating devices with a motion maintaining the latter at a substantially constant angle relatively to the ground.

21. In a cultivator attachment for tractors, the combination of a frame adapted for mounting on the front end of a tractor, said frame comprising a transverse bar, a depending member carried by said bar, a brace rod connected at its rear end with said frame and its front end with the lower portion of said depending member for holding the latter against draft stresses, a draft link pivotally connected at its front end with the lower portion of said depending member, a lifting arm pivotally mounted adjacent to its front end on said frame to swing solely in a vertical plane, link means connected between the rear end portions of said draft link and lifting arm, a cultivating rig rigidly connected with said link means, and a rock shaft connected to lift said rig through said lifting arm, said draft link and lifting arm being proportioned and related whereby said cultivator rig remains at a substantially constant angle relatively to the ground in a plurality of its vertically adjusted positions.

22. In a cultivator attachment for tractors, the combination of a frame adapted for mounting on the front end of a tractor, a pivot member carried by said frame and held substantially against fore and aft movement relatively thereto, a draft link pivotally connected with said pivot member and extending substantially horizontally rearwardly therefrom, a lifting arm pivotally mounted adjacent to its front end on said frame and extending substantially horizontally rearwardly from its pivot axis, a connecting link pivotally connected between the rear portions of said draft link and said lifting arm, a cultivating rig rigidly connected with said connecting link and a rock shaft connected with said lifting arm for raising and lowering said cultivating rig through said lifting arm.

23. In a cultivator, the combination of a frame, a draft link pivotally connected with said frame, a lifting arm pivotally mounted on said frame above said draft link, a connecting member pivotally connected between the swinging ends of said draft link and said lifting arm, said draft link and lifting arm swinging as substantially parallel links, a cultivating rig carried by said connecting member, means for actuating said lifting arm to raise and lower said cultivating rig, and a relief spring connected resiliently to transmit downward pressure from said lifting arm to said connecting member whereby the cultivator element on said rig is forced into the soil under spring pressure.

24. In a cultivator, the combination of a frame, a draft link pivotally connected with said frame, a lifting arm pivotally mounted on said frame above said draft link, a connecting member pivotally connected between the swinging ends of said draft link and said lifting arm, a cultivating rig carried by said connecting member, means for actuating said lifting arm to raise and lower said cultivating rig, and individual screw crank adjusting means for said cultivating rig associated with said lifting arm for raising and lowering the cultivating position of said rig relatively to said frame, said adjusting means being actuatable to exert increased downward pressure on said rig for forcing it into the ground.

25. In a power lift cultivator, the combination with a tractor, of a cultivator attachment connected with said tractor and comprising a frame, a shaft rotatably mounted thereon, power actuated means for driving said shaft, a plurality of cultivator rigs each comprising a cultivating tool, draft means connecting each rig with said frame whereby each rig can rise and fall with a vertical translatory motion, and lifting means operatively connecting said shaft with each rig for lifting said rig with a vertical translatory motion when said shaft is operated in one direction, but permitting the downward translatory motion of any one or more rigs to be interrupted when said shaft is operated in the other direction.

26. In a power lift cultivator, the combination with a tractor, of a cultivator attachment connected with said tractor and comprising a frame, a shaft rotatably mounted thereon, means for actuating said shaft, a plurality of cultivator rigs each comprising a cultivating tool, draft means connecting each rig with said frame whereby each rig can rise and fall with a vertical translatory motion, lifting means operatively connecting said shaft with each rig for lifting said rig when said shaft is operated in one direction and for lowering said rig when said shaft is operated in the other direction, and spring relief means associated with said lifting means and operative to permit either the upward or downward movement of said rig to be interrupted independently of continued motion of said shaft.

27. In a power lift cultivator, the combination of a wheeled frame, a rockshaft mounted thereon, a pair of links one of which is pivotally connected at its front end with said frame and the other of which is mounted at its front end on said rockshaft, a rig beam extending rearwardly from one of said links, a connecting link operatively connecting the rear ends of said links, and a tie link extending between said rig beam and said connecting link.

28. In a power lift cultivator, the combination of a wheeled frame, a rockshaft mounted thereon, a pair of members one of which is pivotally connected at its front end with said frame and the other of which is mounted at its front end on said rockshaft, a rig beam extending rearwardly from one of said members, a connecting link operatively connecting the rear ends of said members, said members being proportioned whereby said connecting link remains at a substantially constant angle relatively to the ground during the vertical swinging movement of said members, and a tie link extending between said rig beam and said connecting link.

In witness whereof, we hereunto subscribe our names this 25th day of June, 1928.

THEOPHILUS BROWN.
WALTER H. SILVER.